(12) United States Patent
Bitner

(10) Patent No.: US 8,874,873 B2
(45) Date of Patent: Oct. 28, 2014

(54) RESOURCES ALLOCATION IN A COMPUTER STORAGE SYSTEM

(75) Inventor: Haim Bitner, Raanana (IL)

(73) Assignee: Infinidat Ltd., Hertzelia (IL)

( * ) Notice: Subject to any disclaimer, the term of this patent is extended or adjusted under 35 U.S.C. 154(b) by 459 days.

(21) Appl. No.: 13/361,302

(22) Filed: Jan. 30, 2012

(65) Prior Publication Data

US 2013/0198478 A1 Aug. 1, 2013

(51) Int. Cl.
*G06F 12/02* (2006.01)
*G06F 9/50* (2006.01)
*G06F 3/06* (2006.01)

(52) U.S. Cl.
CPC ............ *G06F 9/5016* (2013.01); *G06F 3/0631* (2013.01)
USPC ............................ 711/170; 718/104; 709/226

(58) Field of Classification Search
None
See application file for complete search history.

(56) References Cited

U.S. PATENT DOCUMENTS

| 6,601,083 | B1* | 7/2003 | Reznak ..................... 718/104 |
| 8,584,128 | B1* | 11/2013 | Don et al. .................. 718/103 |
| 8,606,930 | B1* | 12/2013 | Jain et al. .................. 709/227 |
| 2003/0028582 | A1* | 2/2003 | Kosanovic ................. 709/105 |
| 2009/0059785 | A1* | 3/2009 | Jogalekar et al. ........... 370/230 |

* cited by examiner

Primary Examiner — Kaushikkumar Patel
(74) Attorney, Agent, or Firm — Oren Reches

(57) ABSTRACT

The presently disclosed subject matter includes a method, system and apparatus, for dynamically controlling resource allocation in a storage system, the storage system comprises at least one storage device and at least one processing unit, the resources being associated with the processing unit. Responsive to a request from a connection for processing data, information in respect of an Allocation state of the processing unit is obtained. The Allocation state is defined as a Limiting Allocation state if the quantity of free resources associated with the processing unit, is lower than a first threshold value. In case the Allocation state of the processing unit is Limiting Allocation state, information in respect of a Connection state of the connection is obtained. The required memory resources are dynamically allocated to the connection according to the current Allocation state of the processing unit and the current Connection state of the connection.

24 Claims, 9 Drawing Sheets

RESOURCES ALLOCATION IN A COMPUTER STORAGE SYSTEM

FIELD OF THE PRESENTLY DISCLOSED SUBJECT MATTER

This invention relates to the field of allocation of memory resources in a computer storage system.

BACKGROUND

In modern computer networks, multiple computers and other hardware devices are interconnected and can operate as a distributed computer system. Server computers in such networks are configured to perform tasks in response to requests received from host computers which are connected to the same network. A host connected to a server is identified at the server side as a connection, where a single host can establish multiple connections with a given server. In a computer storage system, one or more storage control devices can be configured to manage and control a storage space comprising a plurality of storage devices, and make the storage space accessible for connections. For example, in a SCSI computer storage system (operating with a SCSI protocol) different connections, connecting one or more hosts to the storage system, enable sending different types of SCSI commands to a storage device, operating as a SCSI target. SCSI commands include, inter alia, different types of SCSI control commands, which enable a connection to retrieve information in respect of different storage devices operating within the storage system and in respect of data stored in the storage devices. Examples of SCSI control commands include: SCSI Request Sense command directed for obtaining error information from a SCSI target device and SCSI Read Capacity command, which is used for obtaining data capacity information from a target device. In general, responsive to a request issued by a connection, memory resources are allocated by the storage control devices in favor of the connections in order to facilitate the execution of the requested task.

In view of the growing size and complexity of computer systems infrastructure (including for example storage systems) and in view of the fact that the available memory resources which are necessary for executing incoming requests are typically limited, a need arises for solutions to enable efficient management and distribution of the memory resources to the different connections issuing requests (referred to herein as "requesting connections").

Published references considered to be relevant as background to the presently disclosed subject matter are listed below. Acknowledgement of the references herein is not to be inferred as meaning that these are in any way relevant to the patentability of the presently disclosed subject matter.

U.S. Pat. No. 6,650,618 discloses a fairness scheme for managing data flow between nodes in a bi-directional ring network. A method controls the output bandwidth of nodes in a bi-directional ring network by: identifying a congested span comprising a head node having a congested downstream link, and a plurality of chain nodes contributing to the congestion in the downstream link: adjusting the output bandwidth of the head node as a function of the congestion in the downstream link; and adjusting the output bandwidth of the chain nodes as a function of the congestion in the downstream link.

U.S. Pat. No. 7,032,222 discloses a method for flexible allocation of a resource in which a soft limit and a hard limit are assigned to each of a set of potential users of the resource. The soft limits are selected to guarantee access to the resource by all of the potential users. The hard limits are selected to enable each potential user to exceed the corresponding soft limit on a first-come-first-served basis. A request from a user for allocation of a portion of the resource is handled by granting the request, if the request, if allowed, would not exceed soft limit assigned to the user. The request is denied if the request, if allowed, would exceed the hard limit assigned to the user. To avoid overtaxing the capacity of the resource, the request is denied even when the hard limit of the user is not exceeded if the request, if allowed, would cause a total allocation of the resource to exceed a high watermark assigned to the resource.

SUMMARY

According to a first aspect of the presently disclosed subject matter there is provided a method of controlling allocation of memory resources in a computer storage system, the storage system comprising at least one storage device and at least one processing unit, the resources being associated with the processing unit and operable to communicate with a plurality of connections, the method comprising: receiving by the at least one processing unit a request from a connection for processing information related to the storage device; obtaining information in respect of an Allocation state of the processing unit, the allocation state being indicative of quantity of currently allocated resources, which are associated with the processing unit, wherein the Allocation state is defined as a Limiting Allocation state if the quantity of currently allocated resources associated with the processing unit, is greater than a first threshold value; in case the Allocation state of the processing unit is Limiting Allocation state, obtaining information in respect of a Connection state of the connection, wherein the Connection state is defined as a Limiting Connection state if the quantity of resources currently allocated to the connection is greater than a second threshold value; and dynamically allocating to the connection, resources required for processing the information related to the storage device, according to the current Allocation state of the processing unit and the current Connection state of the connection.

According to certain embodiments of the presently disclosed subject matter the method further comprising: in case the Connection state of the connection is defined as Limiting Connection state, allocating to the connection resources, required for processing the information related to the storage device, only if a parameter corresponding to resource allocation history of the connection matches a predefined criteria.

According to certain embodiments of the presently disclosed subject matter, wherein the parameter is a number of un-serviced requests, which were issued by the connection since it was defined in Limiting Connection state, and wherein in order to match the criteria, the number of un-serviced requests must be equal or greater than a predefined value.

According to another aspect of the presently disclosed subject matter, there is provided a storage system comprising: a physical storage space including at least one storage device and a control layer operatively connectable to the physical storage space and to a plurality of connections; the control layer comprising at least one processing unit being associated with memory resources and operable to utilize the memory resources for processing information in response to a request issued by a connection from among the plurality of connections, the control layer being operable to: responsive to a request from a connection for processing information related to the storage device, received by the at least one processing unit, obtain information in respect of an Allocation state of the processing unit, the allocation state being indicative of quantity of currently allocated resources, which are associated with the processing unit, wherein the Allocation state is defined as a Limiting Allocation state if the quantity of currently allocated resources associated with the processing unit, is greater than a first threshold value; in case the Allocation state of the processing unit is Limiting Allocation state, obtain information in respect of a Connection state of the connection, wherein the Connection state is defined as a Limiting Connection state if the quantity of resources currently allocated to the connection is greater than a second threshold value; and dynamically allocate to the connection, resources required for processing the information related to the storage device, according to the current Allocation state of the processing unit and the current Connection state of the connection.

According to a further aspect of the presently disclosed subject matter there is provided a resource management unit operatively connectable to at least one processing unit in a storage system, the storage system comprising a physical storage space including at least one storage device and a control layer operatively connectable to the physical storage space and to a plurality of connections; the control layer comprises the processing unit being associated with memory resources and operable to utilize the memory resources for processing information in response to a request issued by a connection from among the plurality of connections, the resource management unit being operable to:

responsive to a request from a connection for processing information related to the storage device, received by the at least one processing unit, obtain information in respect of an Allocation state of the processing unit, the allocation state being indicative of quantity of a currently allocated resources, which are associated with the processing unit, wherein the Allocation state is defined as a Limiting Allocation state if the quantity of currently allocated resources associated with the processing unit, is greater than a first threshold value;

in case the Allocation state of the processing unit is Limiting Allocation state, obtain information in respect of a Connection state of the connection, wherein the Connection state is defined as a Limiting Connection state if the quantity of resources currently allocated to the connection is greater than a second threshold value; and dynamically allocate to the connection, resources required for processing the information related to the storage device, according to the current Allocation state of the processing unit and the current Connection state of the connection.

According to yet another aspect of the presently disclosed subject matter, a program storage device readable by machine, tangibly embodying a program of instructions executable by the machine to perform method steps of controlling allocation of memory resources in a storage system, the storage system comprising at least one storage device and at least one processing unit, the resources being associated with the processing unit and operable to communicate with a plurality of connections, the method comprising: receiving by the at least one processing unit a request from a connection for processing information related to the storage device; obtaining information in respect of an Allocation state of the processing unit, the allocation state being indicative of quantity of a currently allocated resources, which are associated with the processing unit, wherein the Allocation state is defined as a Limiting Allocation state if the quantity of currently allocated resources associated with the processing unit, is greater than a first threshold value; in case the Allocation state of the processing unit is Limiting Allocation state, obtaining information in respect of a Connection state of the connection, wherein the Connection state is defined as a Limiting Connection state if the quantity of resources currently allocated to the connection is greater than a second threshold value; and dynamically allocating to the connection, resources required for processing the information related to the storage device, according to the current Allocation state of the processing unit and the current Connection state of the connection.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
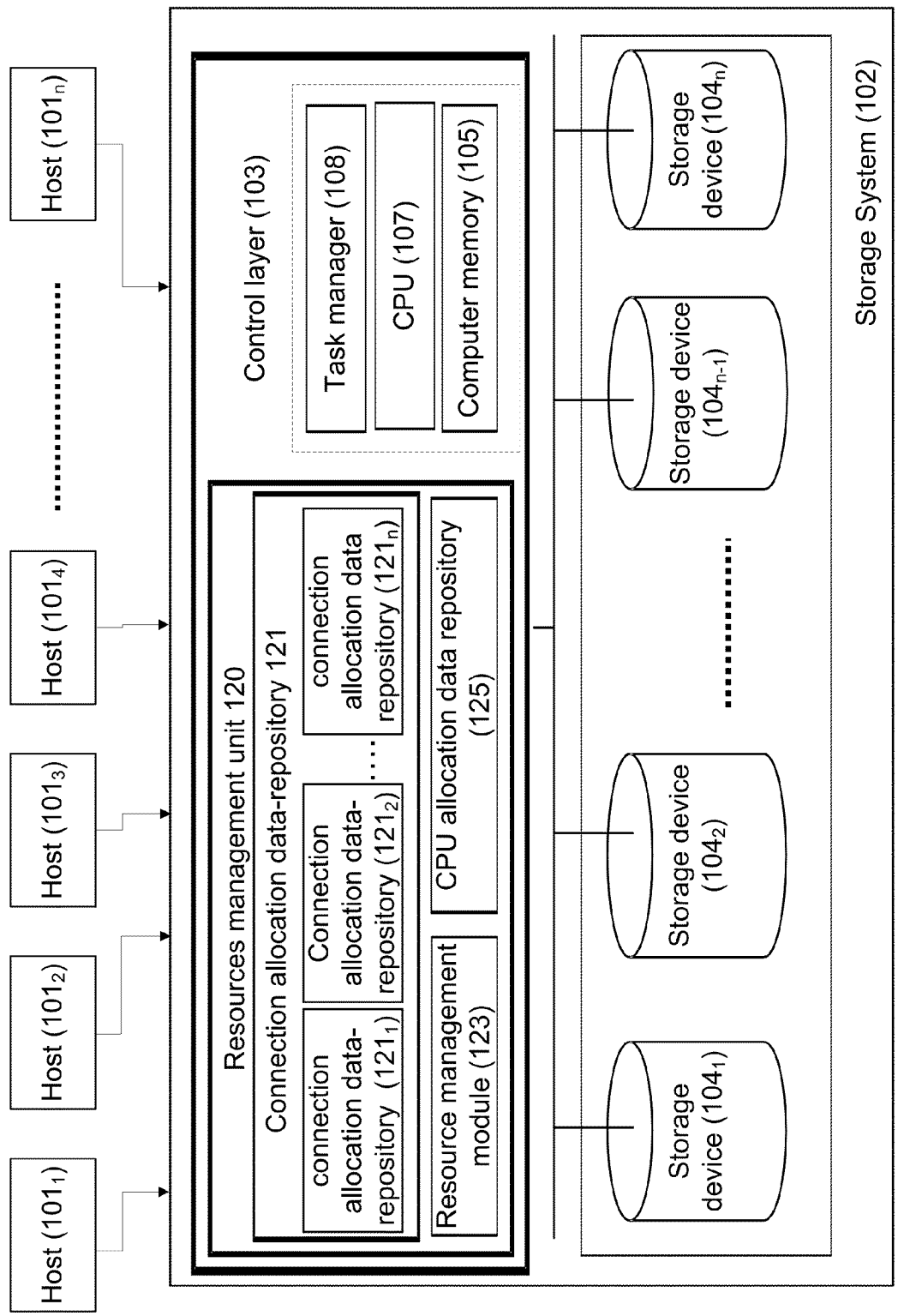
FIG. 1 is a functional block diagram of a computer storage system, according to the presently disclosed subject matter.

In the drawings and descriptions set forth, identical reference numerals indicate those components that are common to different embodiments or configurations. Unless specifically stated otherwise, as apparent from the following discussions, it is appreciated that throughout the specification discussions utilizing terms such as "obtaining", "receiving", "allocating" or the like, include action and/or processes of a computer that manipulate and/or transform data into other data, said data represented as physical quantities, e.g. such as electronic quantities, and/or said data representing the physical objects.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 4, 5, 6, 8 and 9 may be executed. In embodiments of the presently disclosed subject matter one or more stages illustrated in FIGS. 4, 5, 6, 8 and 9 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In different examples of the presently disclosed subject matter, the system may comprise fewer, more, and/or different modules than those shown in FIG. 1.

As mentioned above, efficient management and distribution of limited memory resources, is advantageous for the operation of a storage system. Efficient management and distribution of memory resources is based on predefined allocation logic, which includes rules defining whether or not to allocate the resources which are required for servicing a request issued by a connection. Furthermore, the allocation logic often strives to provide "fair" or balanced distribution of resources for the requesting connections, which aims to service as many requests as possible of different requesting connections, according to their respective priority.

One known approach which attempts to maintain fair distribution is based on a maximal static quantity of resources which are allocated to each connection. The maximal number represents a guaranteed quantity of resources which can be allocated to a respective connection. However, this solution introduces a number of disadvantages. For example, due to its static nature, a connection that reaches its maximal quantity of resources is not serviced even if free memory resources are available in the storage system. In addition, the storage system is at a risk of reaching its limit where all resources are exhausted.

According to an alternative approach, the memory resources are allocated based on a given time-frame, where a predefined number of memory resources can be allocated to a given connection, within a predefined period of time. This type of solution has similar drawbacks to those specified above in respect of the static quantity of resources, as the time frame is rigid and is not influenced by the actual activity within the storage system.

In view of the above, the presently disclosed subject matter includes a method and system operable to dynamically allocate memory resources in a storage system to requesting connections while efficiently utilizing memory resources, maintaining balanced distribution and overcoming the drawbacks of known systems and methods mentioned above.

The dynamic allocation of memory resources disclosed herein, is based on both a current Allocation state in the storage system and a current Connection state of the requesting connection. The Allocation state in the storage system is based on the quantity of currently available (i.e. free) memory resources and the quantity of currently allocated memory resources, in the storage system. The Connection state of the requesting connection depends on the connection's attributes and its memory resources allocation history.

As both the Allocation state in the storage system and the Connection state of a connection are based on dynamic parameters, the decision whether to allocate memory resources to a requesting connection is dynamic and reflects the current availability of free memory resources in the system and in some cases also the specific activity history of the requesting connection.

This approach allows to allocate more memory resources to a requesting connection when the quantity of free memory resource in the storage system is high and to limit the allocation of memory resources to a requesting connection when the quantity of free memory resources is low. Furthermore, this approach enables to limit the allocation of memory resource to connections which have been allocated with a quantity of memory resources that exceeds a prescribed threshold, in order to allow the activity of other connections, which have been allocated with less memory resources and thereby provide a more balanced distribution of memory resources among different connections.

Attention is now drawn to FIG. 1 showing a functional block diagram of a computer storage system, according to the presently disclosed subject matter. Storage system 102 can be connected to a plurality of host computers (including for example workstations, application servers, etc.) illustrated as $101_{1-n}$ sharing common storage means provided by storage system 102. The storage system can comprise a storage control layers 103, comprising one or more appropriate storage control devices operatively coupled to the plurality of host computers and a plurality of data storage devices $104_{1-n}$ constituting a physical storage space.

Control layer 103 can comprise or be otherwise associated with at least one processing unit (e.g. CPU) 107 configured to control and execute operations, such as commands which are issued by connections established by hosts $104_{1-n}$. Control layer 103 can be operable to control operations between hosts $101_{1-n}$, and data storage devices $104_{1-n}$. To this end task manger 108, associated with CPU 107, can be configured to receive incoming commands and manage their execution by CPU 107.

CPU 107 is associated with a computer memory (e.g. RAM) 105 which is utilized by CPU 107 for processing incoming commands. For example, CPU 107 can be configured to execute a SCSI control command, issued by a connection and directed to one of the data storage devices $104_{1-n}$. Memory resources are allocated in computer memory 105 by CPU 107 for enabling the processing information related to incoming commands. Optionally, task manager 108, CPU 107 and computer memory 105 can be consolidated in a single operational unit.

Control layer 103 can be further operable to handle a virtual representation of physical storage space and to facilitate necessary mapping between the physical storage space and its virtual representation. In such cases, control layer 103 can be configured to create and manage at least one virtualization layer interfacing between elements of the computer system (connection computers, etc.) external to the storage system and the physical storage space. The virtualization functions may be provided in hardware, software, firmware or any suitable combination thereof.

The physical storage space may comprise any appropriate permanent storage medium and may include, by way of non-limiting example, one or more disk units (DUs), also called "disk enclosures", comprising several disk drives (disks). The control layer 103 and storage devices $104_{1-n}$ may communicate with connection computers $101_{1-n}$ and within the storage system in accordance with any appropriate storage protocol. Stored data may be logically represented to a client (host) in terms of logical objects. Depending on the storage protocol, the logical objects may be logical volumes, data files, multimedia files, snapshots and other copies, etc.

Control layer 103 can further comprise a resources management unit 120. Resources management unit 120 is configured to control and manage the allocation of memory resources for the benefit of host computers $101_{1-n}$ in order to enable execution of commands issued by one or more connections established between the host and computer system 102. Resources management unit 120 is operable to determine whether or not CPU 107 is allowed to allocate memory resources from computer memory 105, to a requesting connection at the time a request is being issued by the connection. CPU 107 or (any other processor within or connected to control layer 103) can be operable to execute at least part of the tasks provided by resource management unit 120.

Resources management unit 120 can comprise a memory resource management module 123 configured to control the authorization of memory resource allocation to requesting connections. In response to a request to execute an operation which requires allocation of memory resources, memory resource management module 123 checks the Allocation state of the storage system and the Connection state of the requesting connection, and determines whether or not to allocate to the requesting connection the needed resources. The decision can be communicated, for example, to task manager 108, which can be operable to instruct CPU 107 to allocate the needed memory resources in case memory resource management module 123 determines that resource allocation is allowed.

Memory resource management module 123 can be associated with a CPU allocation data-repository 125 which can be utilized for storing information related to Allocation state of one or more respective CPUs in the storage system as described in more detail below. CPU allocation data-repository 125 can be configured as an integral part of memory resource management unit 120 or it can be located at a different location and be associated with memory resource management unit 120 by any type of communication facility.

Resources management unit 120 can further comprise a connection utilized for storing information related to the Connection state of one or more connections. The information stored in allocation data-repository 121 can include information in respect of the characteristic and activity history of one or more connections. For example, connection allocation data-repository 121 can be a data-repository containing some type of data structure (e.g. a table), the data structure comprising information in respect of each requesting connection. In some cases, connection allocation data-repository 121 can be divided into compartments $121_{1-n}$, each compartment assigned for recoding data in respect to a given connection. Similar to CPU allocation data-repository 125, connection allocation data-repository 121 can be configured as an integral part of resources management unit 120 or it can be located at a different location and be associated with resource management unit 120 by any type of communication facility. Optionally, connections allocation data-repository 121 may be fully or partly distributed over one or more host computers such that part or all of the information associated with a connection is stored at the respective host which established the connection.

As explained below in more detail, the information which is stored in memory CPU allocation data-repository 125 and connection allocation data-repository 121 is used by memory resource manager 123 for determining whether to allow allocation of memory resources to a requesting connection. A more detailed description of the operations of resources management unit 120 is disclosed below with reference to FIGS. 4, 5, 6, 8 and 9.

FIG. 1 illustrates a block diagram of a general schematic of the system architecture in accordance with an embodiment of the presently disclosed subject matter. Certain embodiments of the present invention are applicable to the architecture of a computer system described with reference to FIG. 1. However, the invention is not bound by the specific architecture; equivalent and/or modified functionality may be consolidated or divided in another manner and may be implemented in any appropriate combination of software, firmware and hardware. Those versed in the art will readily appreciate that the invention is, likewise, applicable to different computer systems and different storage architectures.

It should be appreciated that although control layer 103 is illustrated in FIG. 1 as a centralized unit, optionally, the functions of control layer 103 may be fully or partly integrated with one or more host $101_{1-n}$ and/or storage devices $104_{1-n}$ and/or with one or more communication devices enabling communication between the hosts and the storage devices. Furthermore, optionally, different components of control layer 103 and/or different storage devices $104_{1-n}$, can be distributed over one or more computer nodes across a computer network in a single or in multiple geographical locations (including duplication for high-availability). Control layer 103 and storage device $104_{1-n}$ can be connected directly (e.g. via a bus) or connected indirectly over a remote connection utilizing hardwired or wireless communication facility. Connections between different components in illustrated in FIG. 1, may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

As mentioned above, control layer 103 in FIG. 1 comprises or is otherwise associated with at least one processor operable for executing related operations as described herein. The term "processor" should be expansively construed to cover any kind of electronic device with data processing capabilities, including, by way of non-limiting example, a personal computer, a server computer, a computing system, a communication device, a processor (e.g. digital signal processor (DSP), a microcontroller, a field programmable gate array (FPGA), an application specific integrated circuit (ASIC), etc.), any other electronic computing device, and or any combination thereof. Although the description disclosed herein is provided with reference to a single CPU this is done merely for the sake of clarity and simplicity and therefore should not be construed as limiting in any way. The same principles which are described herein with reference to a single CPU are applicable to multiple CPUs.

Figure 2:
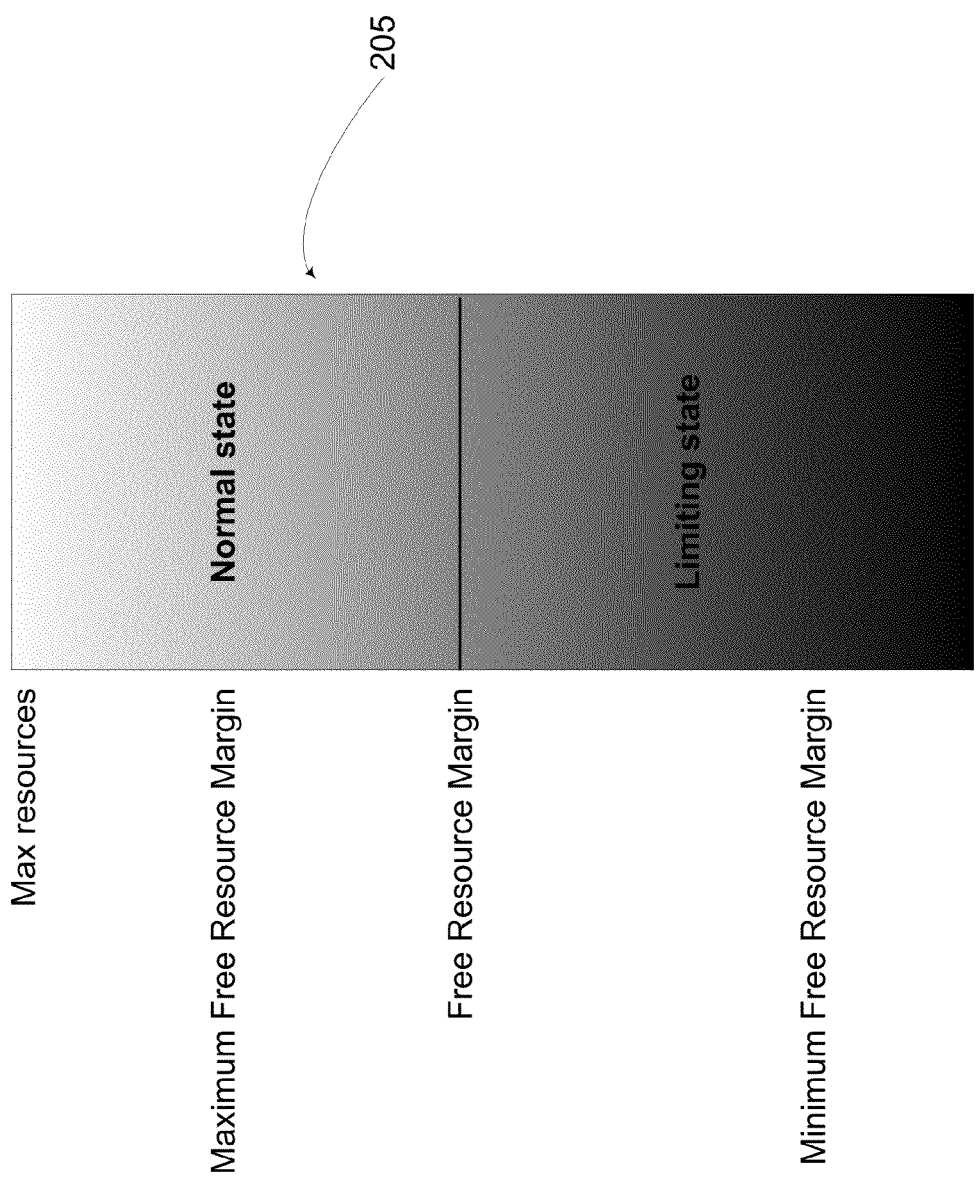
FIG. 2 is a schematic illustration showing a number of principles related to the presently disclosed subject matter.

Bearing the above in mind, attention is now drawn to FIG. 2, which is a schematic illustration showing a number of principles related to the presently disclosed subject matter. Column 205 in FIG. 2 demonstrates the different states of a storage system. According to the non-limiting example illustrated with reference to FIG. 2, at any given point in time, CPU 107 is set in one of two "Resource Allocation states" (or "Allocation states" in short), which are related to its resources allocation status. The first state is Normal Allocation state in which no restrictions on resource allocations are applied, and the second state is Limiting Allocation state, in which the memory resources associated with the CPU are nearing their limit and thus certain limitations are enforced on memory resource allocation.

The top of column 205 represents a max resource value which is a value defining the maximum quantity of memory resources which are available for a given CPU 107 in system 102 at a given time. Free Resources Margin is a dynamic value which defines a threshold to trigger a transition from Limiting Allocation state to Normal Allocation state and vice versa. A default value for Free Resources Margin can equal for example, to max resource/10. Thus, in case the quantity of free memory resources which are available to CPU 107, is greater than Free Resources Margin, the state of CPU 107 is set to Normal Allocation state, and in case it is less than Free Resources Margin, the state of CPU 107 is set to Limiting Allocation state. The quantity of memory resources can be measured by any suitable memory units including for example, bytes or bits. Accordingly, the phrase "quantity of resources" as used herein includes a computer memory of certain size defined by the specified number of memory units.

Resource management module 123 can be configured to monitor the current quantity of available memory resources, and compare this quantity to Free Resources Margin and change the Allocation state of CPU 107 from normal Allocation state to limiting Allocation state and vice versa, based on the result of this comparison.

As mentioned above, Free Resources Margin is a dynamic value which is modified based on certain aspects of the overall allocation status of memory resources associated with CPU 107, which are described below in more detail. The boundaries of the values of Free Resources Margin are defined by maximum Free Resources Margin and minimum Free Resources Margin. Maximum Free Resources Margin is an upper limit of Free Resources Margin (with a respective default value which can be set for example to Max resources/4) and minimum Free Resources Margin is a lower limit of Free Resources Margin (with a respective default value which can be set for example to max resources/100).

The abovementioned parameters including, max resources, Free Resources Margin, maximum Free Resources Margin and minimum Free Resources Margin can all be stored in CPU allocation data-repository 125. Additional parameters which are related to the Allocation state (and stored in CPU allocation data-repository 125) include for example, the following:

Margin Increment: As mentioned above, Free Resources Margin is a dynamic value. Margin increment is the value by which Free Resources Margin is incremented when an increment is merited, as described in more detail below. Example of default value: Max resources/500.

Margin Decrement: Margin Decrement is the value by which Free Resources Margin is decremented when a decrement is merited as described in more detail below. Example of default value: Max resources/2,000,000.

Selective Limiting Threshold Coefficient: the coefficient used to set the selective limiting threshold as a function of Free Resources Margin.

Example of default value: 0.7.

Selective Limiting Threshold: equals Free Resources Margin*selective limiting threshold coefficient.

Limiting Threshold Coefficient: the coefficient used to set the limiting threshold as a function of Free Resources Margin.

Example of default value: 0.5.

Limiting Threshold: equals Free Resources Margin*limiting threshold coefficient.

Inactivity-Number: the number of requests that the CPU 107 has to receive while a given connection has not issued any request, which is required in order to classify the connection as Inactive.

Example of default value: Max resources*2.

Activity-number: the required number of requests that an Inactive connection has to receive in order to be classified as Active.

Example of default value: 5.

Newly Active Number: The number of requests a CPU has to receive during the reception period these requests are received, all the connections (associated with the CPU) that became Active, are classified as Newly Active Connections.

Example of default value: Max Resources/5.

Force Service Number: the number of requests a limited connection has to issue without having them serviced, in order to get service for the next request.

Example of default value: 7.

Target Active Resources: Max Resources—Free Resources Margin.

Target Connection Activity: (TCA): Target Active Resources/the number of Active connections*Connection$_i$ Priority Coefficient.

The specific operations performed by memory resource management module 123, which are related to parameters listed above, are described in more detail below.

As mentioned above, the information which is stored in connections allocation data-repository 121 comprises information related to the Connection state of one or more connections, including for example the characteristics of each connection and its respective allocation history.

The characteristics of a connection can include for example, the following:

Resource Count$_i$: the quantity of resources currently allocated to a given connection$_i$.

Connection$_i$Priority Coefficient: a coefficient assigned to each connection, which defines its allocation priority in respect of other connections. A default value for connection, priority coefficient can equal for example 1.

Connection State: at any given point in time, a connection is found in one of the following two Connection states: Normal Connection state in which no specific restrictions on resource allocations for the connection are applied, and Connection Limiting state in which memory resources are allocated to a given connection, provided that a certain predefined restricting criterion has been met by the connection.

In addition, each connection is also associated with a parameter, which represents the current activity rate of a given connection. According to certain embodiments of the presently disclosed subject matter, at any given point in time, a connection is found in one of three Activity states indicating its activity rate, including:

Inactive: the connection has not issued any request during a time period, and during this time period CPU 107 has received an Inactivity-Number (IAN) of requests from other connections. The Inactivity-Number (IAN) defines the required number of requests that should be received by CPU 107 during the time a given connection has not issued any requests, in order to classify the given connection as Inactive. Assuming for example, the Inactivity-Number equals 100, CPU 107 can be configured to count every 100 requests which are received from different connections, and classify as Inactive any connection that did not issue one of the 100 requests.

Pre-Active: An Inactive connection has issued requests, but less than an Activity-Number (AN) of requests. The Activity-Number (AN) defines a number of requests which must be issued by an Inactive (or Pre-Active) connection in order to become active. The Activity-Number and Inactivity-Number can be defined as connection specific parameters, where a specific Activity-Number value and/or Inactivity-Number are assigned to each connection.

Active: a given connection which is neither Inactive nor Pre-Active.

Figure 3:
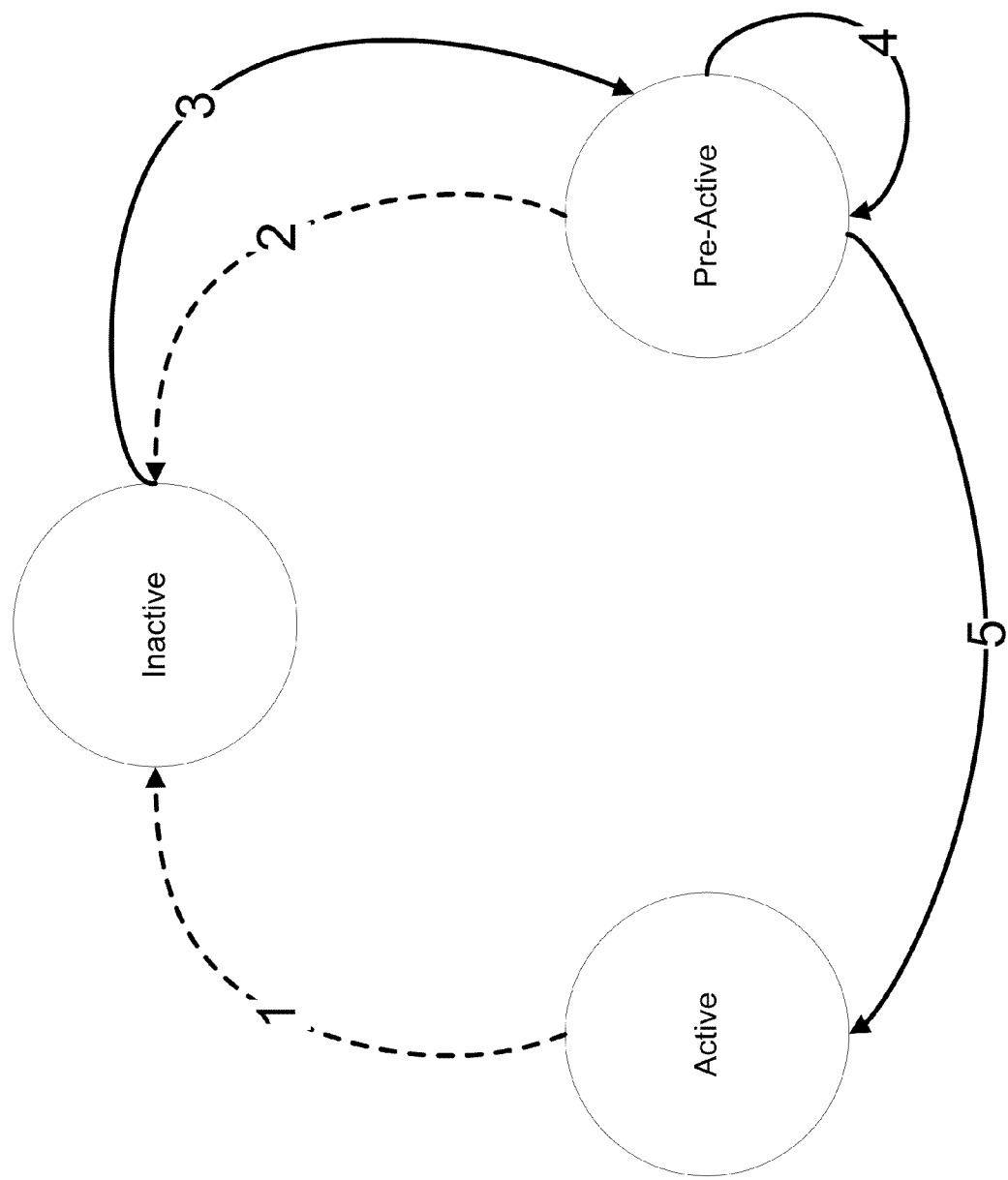
FIG. 3 is a schematic diagram illustrating an example of transition logic from one activity state to the other, in accordance with the presently disclosed subject matter.

FIG. 3 is a schematic diagram illustrating an example of transition logic from one Activity state to the other, in accordance with the presently disclosed subject matter. Each of the three Activity states is listed in one of the circles in FIG. 3. An Active connection becomes Inactive (arrow 1) if CPU 107 has received Inactivity-Number of requests, and during this time the Active connection has issued no requests. Similarly, a Pre-Active connection becomes Inactive (arrow 2) if CPU 107 has received Inactively-Number of requests and during this time, the Pre-Active connection has issued no requests. An Inactive connection becomes Pre-Active (arrow 3) in case the connection issued a request. A Pre-Active connection remains Pre-Active (arrow 4) if it issues less requests than Activity-Number of requests. A Pre-Active connection becomes active (arrow 5) if the number of requests which were issued by the Pre-Active connection is equal or greater than Activity-Number.

Figure 4:
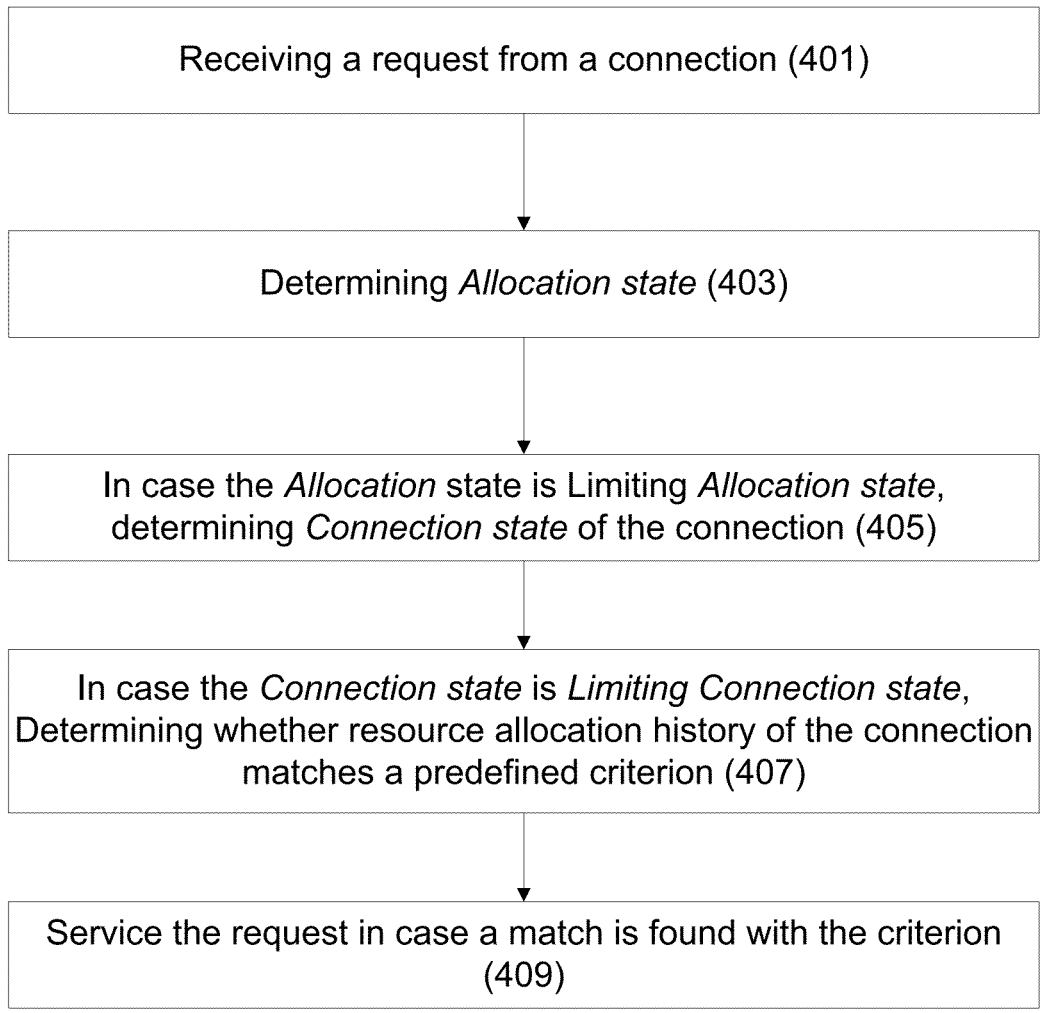
FIG. 4 is a generalized flowchart showing operations performed, in accordance with the presently disclosed subject matter.

FIG. 4 is a generalized flowchart showing operations performed, in accordance with the presently disclosed subject matter. The operations illustrated with reference to FIG. 4, as well as FIGS. 5, 6, 8 and 9, are described below with reference to control layer 103, and more specifically in relation to resource management unit 120, resource management module 123 and CPU 107 illustrated in FIG. 1. However, it should be appreciated that the specific system architecture illustrated in FIG. 1 is a non-limiting example only, which is provided herein for the sake of better clarity of the description. Accordingly, in other examples and in different configuration of system 102, the same operations can be performed by one or more additional or alternative components.

At block 401 a request, issued by a connection, is received in system 102. The request is directed to a CPU operating in system 102, in association with control layer 103 (e.g. CPU 107). In response to the request, before the request is serviced, control layer 103 (e.g. with the help of resource management module 123) is configured to determine the allocation state of the respective CPU 107. As explained above, the state of the CPU 107 represents the availability of free memory resources which are associated with CPU 107 (block 403). Memory resources in computer memory 105 are associated with CPU 107 and utilized for enabling CPU 107 to process information in response to a request issued by a connection.

In case it is determined that the quantity of available free resources is less than a predefined threshold (e.g. less than Free Resources Margin) and accordingly CPU 107 is in Limiting Allocation state, the process continues to determine the state of the requesting connection (block 405). As explained above, according to certain embodiments of the presently disclosed subject matter, a connection can be in a Limiting Connection state or Normal Connection state. The state of a connection is based, inter alia, on its resource allocation history. A recently active connection, for which the quantity of resources that have been allocated exceed a prescribed threshold, is set to Limiting Connection state.

The activity of a connection, which is in Limiting Connection state, is limited in comparison to a connection in Normal Connection state. Requests issued by a connection in Limiting Connection state are serviced only if the resource allocation history of the connection matches a predefined criterion. The resource allocation history characterizes the history of the activity of the connection and can include for example records of the requests which were issued by the connection and information indicating whether these requests were serviced or not. Accordingly, at block 407, a parameter, corresponding to the resource allocation history of the connection is compared with a predefined criterion. The parameter can be for example a value indicative of the recent activity of the requesting connection. This comparison enables to ensure that the activity of a connection which is in Limiting Connection state is indeed limited. Specific examples of parameters corresponding to resource allocation history and a respective criterion, are provided below. The term "criterion" as used herein should be expansively construed to include any compound criterion, including, for example, several criteria and/or their logical combinations.

In case a match is found with the criterion, this means that the activity of the requesting connection (in Limiting Connection state) has been reduced to a level which now allows servicing the connection (block 409). Otherwise, the request issued by the connection is not serviced (at least temporarily).

Figure 5:
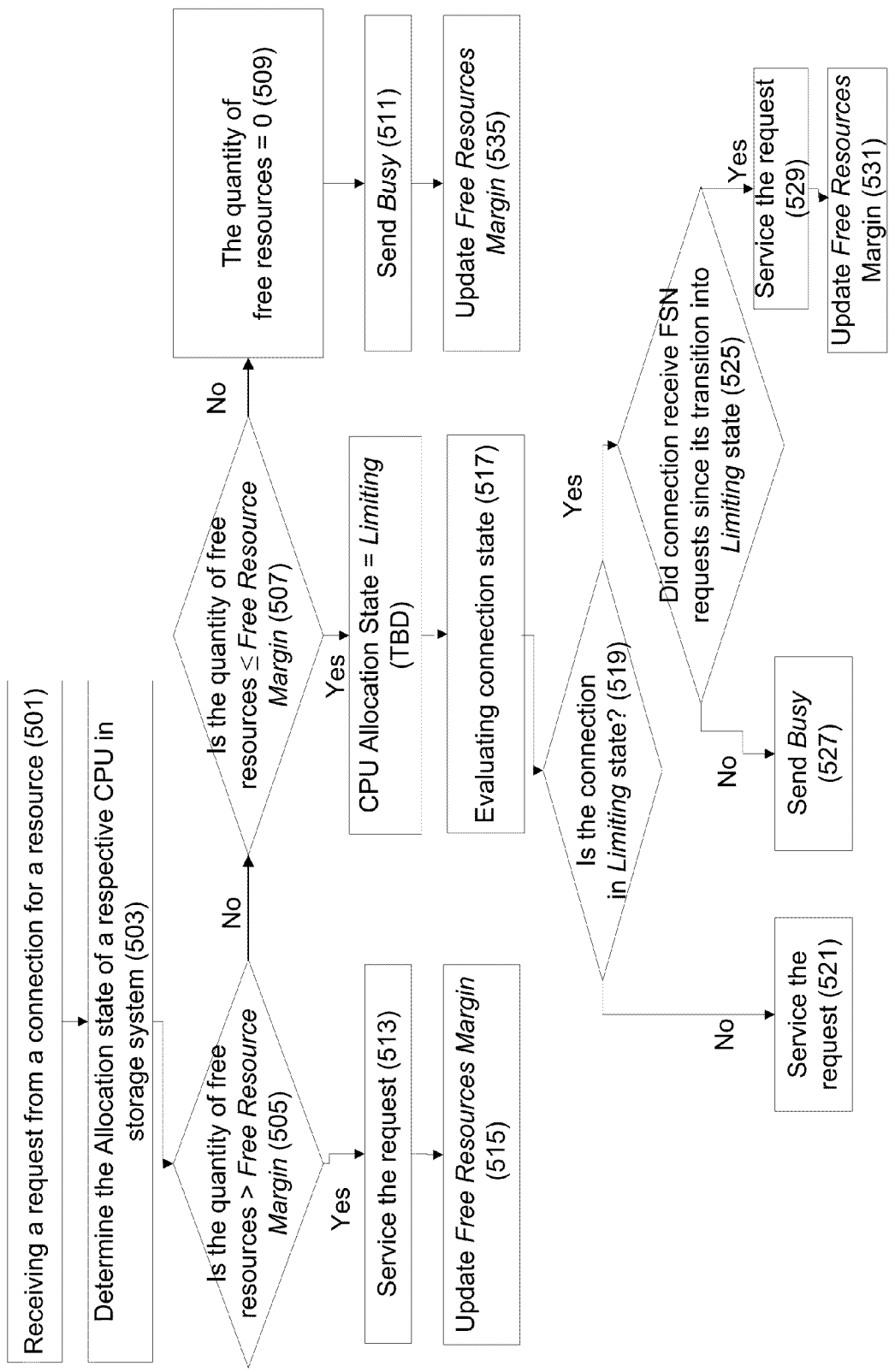
FIG. 5 is a flowchart showing operations performed, according to the presently disclosed subject matter.

Attention is now drawn to FIG. 5 showing a flowchart showing operations performed, according to the presently disclosed subject matter. FIG. 5 is based on similar principles to those illustrated above with reference to FIG. 4, and exemplifies these principles in more detail. At block 501 a request is received from a connection in system 102. The request can be, for example, a control command requesting information regarding the operation of a certain storage device. The request can be received, for example, by task manager 108, which can be configured to send a query to memory resource management unit 120 in order to determine whether the required memory resource can be allocated to the requesting connection or not.

According to one example, each time memory resources are being freed, e.g. after the execution of a command is completed, resource manager module 123 can be configured to compare the quantity of free resources with Free Resources Margin and determine the state of a respective CPU 107 accordingly. If the quantity of free resources is greater than Free Resources Margin, the state is set to Normal Allocation state, otherwise it is set to Limiting Allocation state. Information in respect of the current state of CPU 107 can be stored in Resource management data-repository 125.

Additionally or alternatively, resource management module 123 can be configured, responsive to a request issued by a connection, to determine the current state of CPU 107. To this end, resource management module 123 can be configured to determine the quantity of currently available free memory resources and compare this quantity with Free Resources Margin, and based on this comparison, determine the state of CPU 107. To this end, both the quantity of currently available free memory resources and Free Resources Margin can be obtained, for example, from data-repository 125.

In case the quantity of currently available free memory resources is zero (block 509), resource management module 123 can be configured to send a corresponding message to the requesting connection, indicating that CPU 107 is currently busy and there are no memory resources available for servicing the request (block 511). In addition, according to certain embodiments, the value of Free Resources Margin can be updated. In this case, the value of Free Resources Margin is incremented. A more detailed description of an example of an update process of Free Resources Margin is provided below, with reference to FIG. 9.

In case the quantity of currently available free memory resources is greater than the (or in some cases equal to) Free Resources Margin, i.e. CPU 107 is in Normal allocation state (block 505), resource management module 123 can be configured to service the request and allocate the required memory resource to the requesting connection (block 513). According to one example, resource management module 123 can be configured to indicate to task manager 108 that the allocation to the request can be serviced, and, in response, task manager 108 continues to process the request and enable the allocation of the required memory resource by CPU 107.

In addition, according to certain embodiments, the value of Free Resources Margin can be updated. In this case the value of Free Resource Margin is decremented. A more detailed description of an example of an update process of Free Resources Margin is provided below, with reference to FIG. 9.

Turning to block 507, in case the quantity of currently available free memory resources is less than (or in some cases equal to) Free Resource Margin, the CPU 107 is set to Limiting Allocation state. Resource management module 123 can be configured to evaluate the state of the requesting connection and determine whether the connection is in a Normal Connection state or Limiting Connection state (block 517). A detailed description of the process of evaluating the state of a connection is explained below, with reference to FIGS. 6 and 8.

In case it is determined that the requesting connection is in Normal Connection state, resource management module 123 can be configured to enable servicing the request and allocating the required memory resource for the requesting connection (block 521), as explained above with reference to block 513.

In case it is determined that the requesting connection is in Limiting Connection state, it is determined (e.g. by resource management module 123) whether the connection received FSN (Force Service Number) requests since its transition into Limiting Connection state (block 525). FSN is an example of a parameter indicative of the resource allocation history of a connection, mentioned above with reference to block 407 in FIG. 4. More specifically, FSN is a value representing a number of requests a connection in a Limiting Connection state must issue, without having the requests serviced by CPU 107, before its next request is serviced. This limitation is applied in order to restrict the activity of connections in Limiting Connection state. Connections in Limiting Connection state are connections, which were recently more active than other connections, and the FSN limitation enables to limit the activity of such connections and make more resources available for servicing the requests of other connections which were less active.

Accordingly, in block 525 it is determined whether the requesting connection has already issued a number of un-serviced requests (issued requests which were not serviced by the respective CPU) which equals the FSN value. In case it has not, resource management module 123 can be configured to send a message indicating that the system is busy and no service will be provided to the requesting connection (block 527). Otherwise, resource management module 123 can be configured to enable servicing the request and allocating the required memory resource for the requesting connection (block 529). Resource management module 123 can be further configured to update the value of the Free Resource Margin (block 531).

Figure 6:
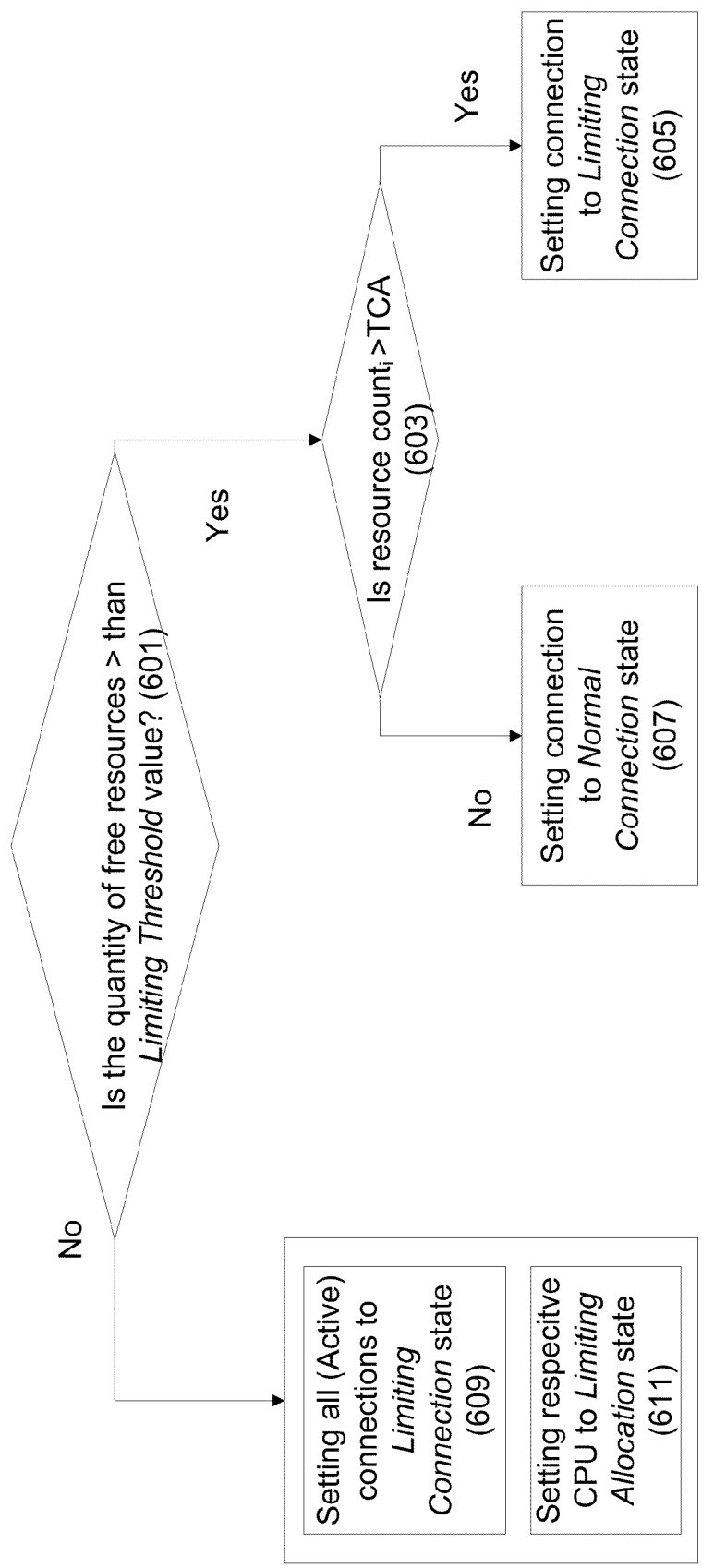
FIG. 6 is flowchart showing an example of a sequence of operations carried out in processes of determining the state of a connection, according to the presently disclosed subject matter.

FIG. 6 is flowchart showing an example of a sequence of operations carried out in processes of determining the state of a connection, according to the presently disclosed subject matter. In order to determine the state of the requesting connection, the quantity of free resources available to CPU 107, is compared with a predefined Limiting Threshold value (block 601).

Limiting Threshold value is a value which represents a minimum quantity of free resources, where in case the quantity of free resources drops below this quantity, steps limiting the activity of connections are taken. According to one example, Limiting Threshold value is defined as a function of Free Resource Margin. The value of Limiting Threshold can be calculated with the help of a Limiting Threshold Coefficient which determines the value of the Limiting Threshold in respect of Free Resource Margin. Limiting Threshold Coefficient can be multiplied by Free Resource Margin in order to obtain Limiting Threshold.

In case the quantity of free resources is smaller than (or possibly equal to) Limiting Threshold value, resource management module 123 can be configured to set all Active connections (including the requesting connection) to Limiting Connection state (block 609) and the state of the respective CPU is set to Limiting Allocation state (block 611).

In case the quantity of free resources is greater than (or possibly equal to) Limiting Threshold value, the state of connection is determined based on a comparison between the resource count of the requesting connection and a TCA value (block 603). As previously disclosed, one of the characteristics which is monitored by resource management module 123, in respect of each connection, is resource $Count_i$, which is a value that represents the quantity of memory resources which is currently allocated to a given $connection_i$. Each time resources are allocated to a given connection, the value of $Count_i$ is incremented by resource management module 123 to represent the current quantity of resources which are allocated to the connection. When memory resources, allocated to a given connection, are freed, the respective Count value is decremented in a similar manner. TCA (Target Connection Activity) is a value which is used for representing a pre-defined threshold of a level of activity for a given connection. According to one example, TCA can be calculated based on the following equation:

Target Active Resource/the Number of Active connections*connection, Priority Coefficient where Target Active Resource is equal to the difference between Max Resources and Free Resources Margin and accordingly represents the maximal quantity of memory resources which can be allocated to connections while CPU 107 is maintained in Normal state. In case the quantity of allocated resources is greater than Target Active Resource number, CPU 107 is set to Limiting Allocation state.

The number of Active connections is the actual number of connections which are currently in Active state. Dividing Target Active Resources by the number of Active Connections gives a value representing the maximal quantity of memory resource that can be potentially allocated to each one of the active connections while the CPU remains in Normal Allocation state, assuming that all active connections have an identical priority. By multiplying this value by $Connection_i$ Priority Coefficient, the TCA value is obtained, which is a target value representing a maximal quantity of resources that can be potentially allocated to $connection_i$ (in this case the requesting connection), while the CPU remains in Normal Allocation state and taking into consideration the priority coefficient of $connection_i$.

In case $count_i$ of the requesting connection (i.e. connection) is greater than TCA, the state of the requesting connection is set to Limiting Connection state (block 605). Otherwise the requesting connection is set to Normal Connection state (block 607).

Figure 7:
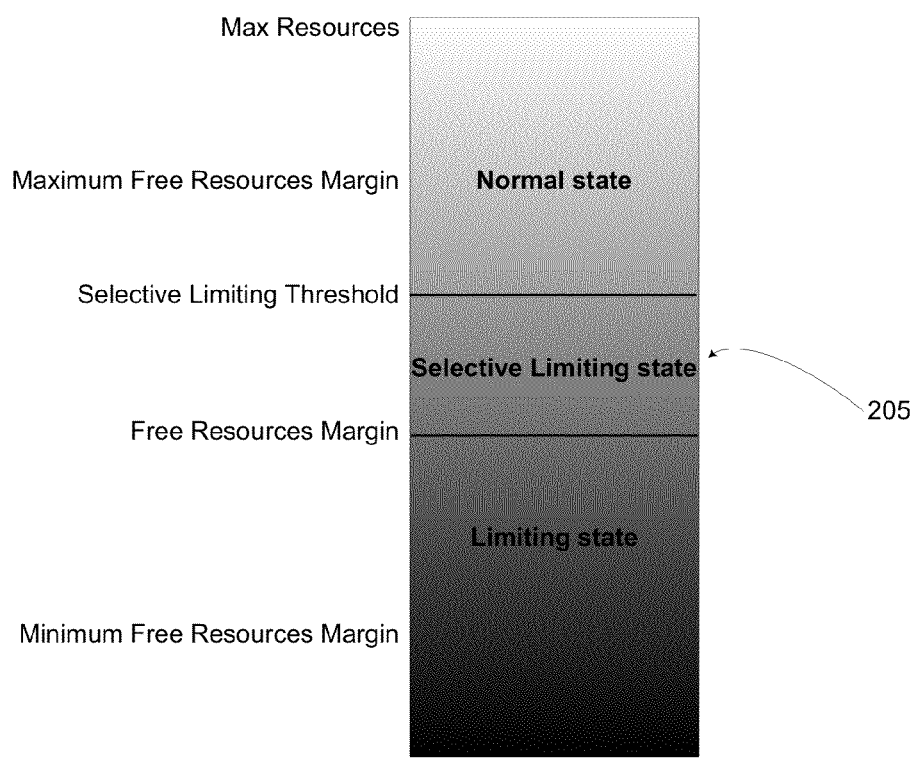
FIG. 7 schematically illustrates a variation of the principles illustrated in FIG. 2, according to the presently disclosed subject matter.

Turning now to FIG. 7, it schematically illustrates a variation of the principles illustrated in FIG. 2, according to the presently disclosed subject matter. In FIG. 7, an additional threshold, named Selective Limiting Threshold, is defined between the Free Resource Margin and Max Resource value. The Selective Limiting Threshold enables to define an intermediate state in which a substantial portion of the system's resources has been allocated, however the system has not yet reached the Limiting Threshold and therefore it is not yet in Limiting Allocation state. According to this example, CPU 107 can be three different states, including:

Normal in which no restrictions on resource allocation are enforced.

Selective Limiting in which partial limitations on resource allocation are enforced.

Limiting in which full limitations on resource allocation are enforced.

The use of a second, intermediate, threshold provides more flexibility for controlling the resource allocation, which can be more accurately adapted to the current availability of free resources. The use of a Selective Limiting Threshold can have influence, for example, on the process of evaluating the connection state, which was described above with reference to FIG. 6.

Figure 8:
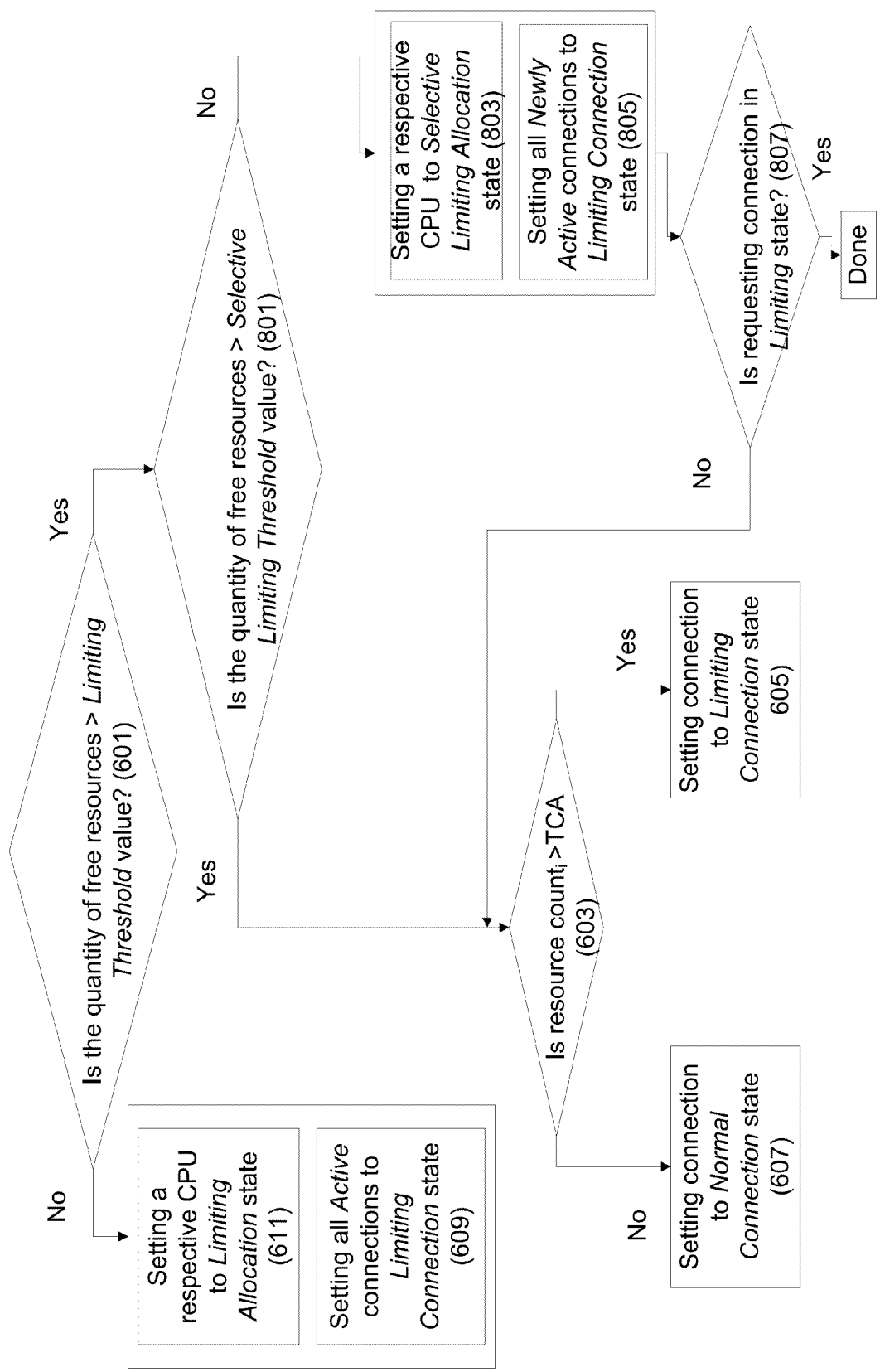
FIG. 8 is a flowchart showing another example of a sequence of operations carried out in a process of determining the connection state, according to the presently disclosed subject matter.

FIG. 8 is flowchart showing another example of a sequence of operations carried out in a process of determining the connection state, according to the presently disclosed subject matter. Blocks in FIG. 8 representing identical blocks in FIG. 6 are numbered with identical reference numerals. As explained above, in order to determine the state of the requesting connection, the quantity of free resources is compared with a predefined Limiting Threshold value (block 601).

In case the quantity of free resources is smaller than (or possibly equal to) Limiting Threshold, resource management module 123 can be configured to set all Active connections (including the requesting connection) to Limiting Connection state (block 609) and the state of the respective CPU is set to Limiting Allocation state, as well (block 611).

In case the quantity of free resources is greater than (or possibly equal to) Limiting Threshold, the quantity of free resources is compared with a predefined Selective Limiting Threshold value (block 801). In case it is determined that the quantity of free resources is greater than (or possibly equal to) Selective Limiting Threshold the resource $Count_i$ of the requesting connection$_i$ is compared with a respective TCA value (block 603). In case resource Count of the requesting connection is greater than the TCA value, the requesting connection is set to Limiting Connection state (block 605). Otherwise the requesting connection is set to Normal state (block 607).

In case it is determined that the quantity of free resources is smaller than (or possibly smaller than) Selective Limiting Threshold, resource management module 123 can be configured to set all Newly Active connections to Limiting Connection state (block 805) and set the state of the respective CPU to Selective Limiting state as well (block 803).

Newly Active connections are connections which became active during a period of time during which CPU 107 has received a predefined number (i.e. Newly Active Number) of requests. Thus, any connection which issued at least one request to a given CPU and became active during a time Newly Active Number of requests have been issued to the same CPU, is classified as a Newly Active connection. Assuming for example, that the Newly Active Number is set to 100, resource management module 123 can be configured to check which of the connections that issued one of the last 100 requests, had its activity state transformed to Active state as a result of its requests and designate such connections as Newly Active connections.

As the reader may recall, a connection becomes Active once a predefined number of requests (i.e. Activity-Number of requests), issued by the connection, are serviced. Thus, the approach disclosed with reference to FIG. 8 is directed to selectively limit the activity of connections that recently became Active (i.e. connections which recently executed the required Activity-Number of requests) in order to maintain more resources for other connections which were recently Inactive or Pre-Active.

Note that in case a connection does not issue requests during a time in which CPU 107 receives an Inactivity-Number of requests from other connections, that connection becomes In-Active. Therefore, in order to become Active a connection must issue requests frequently enough to avoid becoming In-Active again. Therefore, a connection which becomes Active is a connection which issued frequent requests during the time previous to becoming Active, or otherwise it would have become In-Active.

At block 807 it is determined whether the requesting connection is in Limiting Connection state. In case the requesting connection is in Limiting Connection state (if it was previously in Newly Active state), the process ends. Otherwise, the process turns to block 603 in order to re-determine the state of the requesting connection based on its resource Count and a respective TCA value, as explained above.

Figure 9:
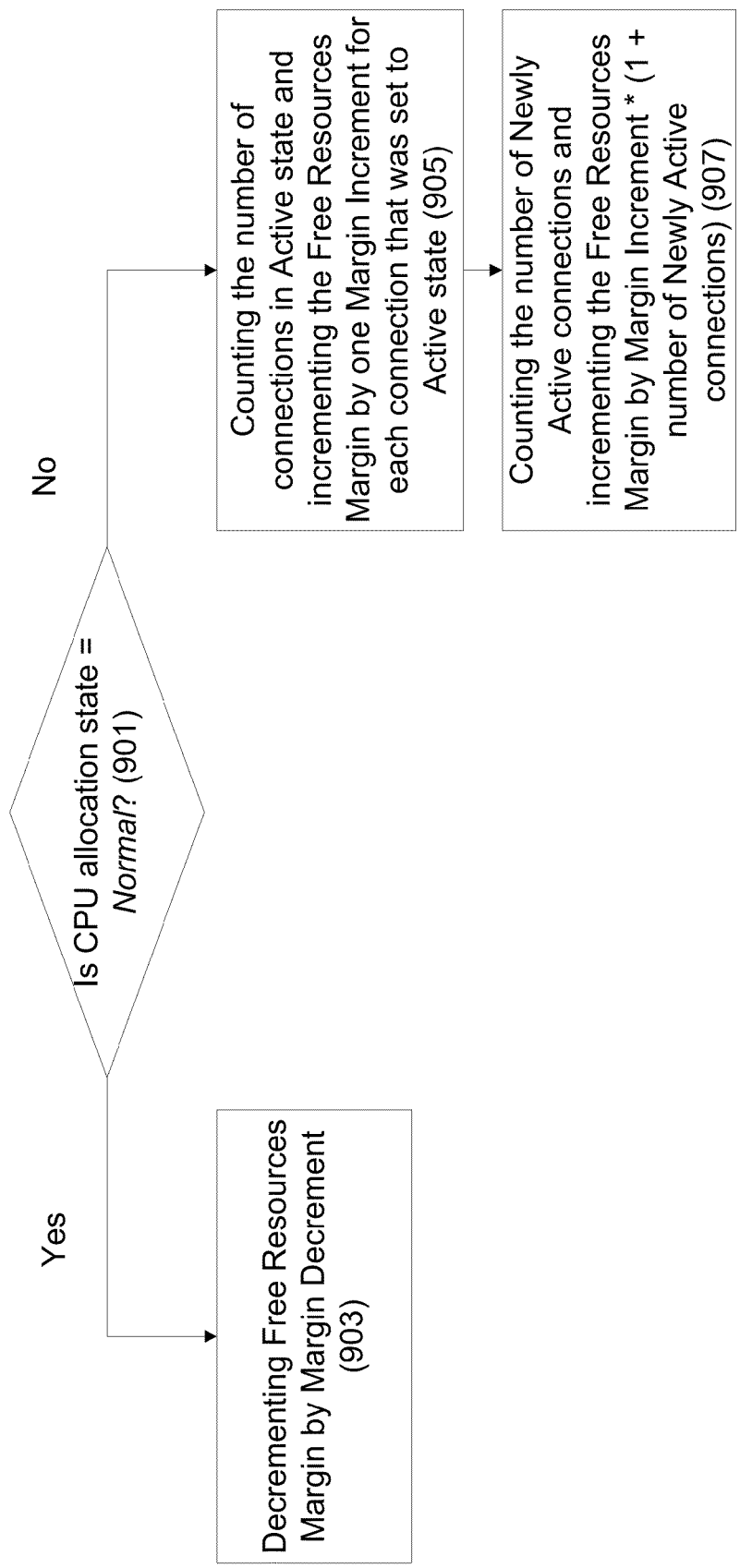
FIG. 9 is a flowchart showing an example of a sequence of operations carried out in an update process of Free Resources Margin, according to the presently disclosed subject matter.

FIG. 9 is a flowchart showing an example of a sequence of operations carried out in an update process of Free Resources Margin, according to the presently disclosed subject matter. As disclosed above with reference to FIG. 5, Free Resources Margin can be updated (e.g. with the help of resource management module 123) at least in two occasions, indicated by blocks 515 and 531. The following process exemplifies how the update can be carried out.

At block 901 it is determined whether CPU 107 is in Normal Allocation state or not. In case the allocation state of CPU 107 is Normal, Free Resources Margin is decremented by a value which equals to margin decrement (block 903). As CPU is in Normal Allocation state, the restriction on memory resource allocations can be made more lenient, and accordingly the Free Resources Margin is decremented by Margin decrement value. The value of Free Resources Margin is restricted by a lower limit value defined by Minimum Free Resources Margin and therefore it cannot be decremented below this value.

Otherwise in case CPU 107 is in Limiting Allocation state, Free Resources Margin is incremented as follows:

Count the number of connections in the Active state and increment the Free Resources Margin by one Margin Increment for each connection that is in Active state (block 905).

Count the number of Newly Active connections and increment the Free Resources Margin by Margin Increment*(1+ number of Newly Active connections) (block 907). The value of Free Resources Margin is restricted by an upper limit value defined by Maximum Free Resources Margin and therefore it cannot be incremented above this value.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A method of controlling allocation of memory resources in a storage system, the storage system comprising at least one storage device and a processing unit, said memory resources being associated with said processing unit and operable to communicate with a plurality of connections, the method comprising:
   receiving by the storage system a request from a connection for processing information related to said at least one storage device;
   obtaining information in respect of an Allocation state of said processing unit, the allocation state being indicative of a quantity of currently allocated resources associated with said processing unit, wherein said Allocation state is defined as a Limiting Allocation state if the quantity of currently allocated resources associated with said processing unit is greater than a first threshold value;
   in case the Allocation state of said processing unit is Limiting Allocation state, obtaining information in respect of a Connection state of the connection, wherein said Connection state is defined as a Limiting Connection state if a quantity of resources currently allocated to the connection is greater than a second threshold value; and
   dynamically allocating to said connection, memory resources required for processing said information related to said at least one storage device, according to the Allocation state of said processing unit and the Connection state of said connection.

2. The method according to claim 1 further comprising:
   in case the Connection state of said connection is defined as Limiting Connection state, allocating to said connection, the memory resources required for processing said information related to said at least one storage device, only if a number of un-serviced requests issued by said connection is equal to or greater than a predefined value.

3. The method according to claim 1 further comprising:
   in case the Connection state of said connection is Normal Connection state, allocating to said connection, the memory resources required for processing said information related to said at least one storage device; wherein said Connection state is defined as Normal Connection state if the quantity of resources currently allocated to the connection is less than said second threshold value.

4. The method according to claim 1 further comprising:
   defining the Connection state of said Connection, wherein the defining of the connection state of said connection comprises:
   in case the quantity of currently allocated resources associated with said processing unit is less than a Limiting Threshold value and if a Resource Count value of the Connection is less than a predefined value, determining the Connection state of said connection as Normal Connection state; wherein said Resource Count value is indicative of a quantity of resources currently allocated to the connection and said predefined value represents a maximal quantity of resources that are allowed to be allocated to said connection;
   otherwise, determining the Connection state of said connection as Limiting Connection state.

5. The method according to claim 1 further comprising:
   defining the Connection state of said connection including:
   in case the quantity of currently allocated resources associated with said processing unit is less than a Limiting threshold value and greater than a Selective Limiting threshold value, setting the Connection state of any connection defined as Newly Active, to Limiting Connection state,
   wherein Newly Active connections are connections which became active during a period of time, during which a predefined number of requests have been issued to the processing unit.

6. The method according to claim 1 wherein in case the Allocation state of said processing unit is Normal Allocation state, the method further comprising decrementing said first threshold, wherein the Allocation state is defined as Normal Allocation state if the quantity of free resources associated with said processing unit, is greater than said first threshold value.

7. The method according to claim 1 wherein, in case the Allocation state of said processing unit is Normal Allocation state, the method further comprising decrementing said first threshold value.

8. The method according to claim 7 wherein said decrementing is done by a predefined Margin Decrement value.

9. The method according to claim 1 wherein in case the Allocation state of said processing unit is Limiting Allocation state, the method further comprising incrementing said first threshold value.

10. The method according to claim 9 wherein said incrementing comprises:
    counting the number of connections currently associated with said processing unit, which are in Active state and incrementing said first threshold by a predefined Margin Increment value for each connection that is in Active state; and
    counting the number of connections currently associated with said processing unit, which are defined as Newly Active connections and incrementing said first threshold by said Margin Increment value for multiplied by a another value which is equal to the number of Newly Active connections plus 1.

11. A storage system comprising:
    a physical storage space including at least one storage device and a control layer operatively connectable to said physical storage space and to a plurality of connections; said control layer comprising processing unit being associated with memory resources and operable to utilize said memory resources for processing information in response to a request issued by a connection from among said plurality of connections, said control layer being operable to:
    responsive to a request from a connection for processing information related to said at least one storage device, received by said storage system,
    obtain information in respect of an Allocation state of said processing unit, the allocation state being indicative of a quantity of currently allocated resources associated with said processing unit, wherein said Allocation state is defined as a Limiting Allocation state if the quantity of currently allocated resources associated with said processing unit is greater than a first threshold value;
    in case the Allocation state of said processing unit is Limiting Allocation state, obtain information in respect of a Connection state of the connection, wherein said Connection state is defined as a Limiting Connection state if a quantity of resources currently allocated to the connection is greater than a second threshold value; and
    dynamically allocate to said connection, memory resources required for processing said information related to said at least one storage device, according to the current Allocation state of said processing unit and the current Connection state of said connection.

12. The storage system according to claim 11 wherein said control layer comprises or is otherwise associated with a data-repository operable for storing information related to the Allocation state of said processing unit.

13. The storage system according to claim 11 wherein said control layer is associated with a connection allocation data-repository operable for storing information related to Connection state of each one of said plurality of connections.

14. The storage system according to claim 11 wherein, in case the Connection state of said connection is defined as Limiting Connection state, said control layer is further operable to allocate to said connection, the memory resources required for processing said information related to said at least one storage device, only if a number of un-serviced requests issued by said connection is equal to or greater than a predefined value.

15. The storage system according to claim 11 wherein in case the Connection state of said connection is Normal Connection state, said control layer is further operable to allocate to said connection, the memory resources required for processing said information, related to said at least one storage device; wherein said Connection state is defined as Normal Connection state if the quantity of resources currently allocated to the connection is less than said second threshold value.

16. The storage system according to claim 11 wherein said control layer is further operable to define the Connection state of said Connection including:
in case the quantity of currently allocated resources associated with said processing unit is less than a Limiting Threshold value and if a Resource Count value of the Connection is less than a predefined value, determine the Connection state of said connection as Normal Connection state; wherein said Resource Count value is indicative the quantity of resources currently allocated to the connection and said predefined value represents a maximal quantity of resources that are allowed to be allocated to said connection;
otherwise, determine the Connection state of said connection as Limiting Connection state.

17. The storage system according to claim 11 wherein said control layer is further operable to define the Connection state of said Connection including:
in case the quantity of currently allocated resources associated with said processing unit is less than a Limiting threshold value and greater than a Selective Limiting threshold value, set the Connection state of any connection defined as a Newly Active, to Limiting Connection state,
wherein Newly Active connections are connections which became active during a period of time, during which a predefined number of requests have been issued to the processing unit.

18. The storage system according to claim 11 wherein in case the Allocation state of said processing unit is Normal Allocation state, said control layer is further operable to decrement said first threshold, wherein the Allocation state is defined as Normal Allocation state if the quantity of free resources associated with said processing unit, is greater than said first threshold value.

19. The storage system according to claim 11 wherein in case the Allocation state of said processing unit is Limiting Allocation state, said control layer is further operable to decrement said first threshold value.

20. The storage system according to claim 19 wherein said first threshold value is decremented by a predefined Margin Decrement value.

21. The storage system according to claim 11 wherein in case the Allocation state of said processing unit is Normal Allocation state, said control layer is further operable to increment said first threshold.

22. The storage system according to claim 19 wherein in order to increment said first threshold value said control layer is further operable to:
count the number of connections currently associated with said processing unit, which are in Active state and increment said first threshold by a predefined Margin-Increment value for each connection that is in Active state; and
count the number of connections currently associated with said processing unit, which are defined as Newly Active connections and increment said first threshold value by said Margin Increment value multiplied by a another value which is equal to the number of Newly Active connections plus 1.

23. A resource management unit that comprises hardware, and is operatively connectable to a processing unit in a storage system, the storage system comprising a physical storage space including at least one storage device and a control layer operatively connectable to said physical storage space and to a plurality of connections; said control layer comprises said processing unit being associated with memory resources and operable to utilize said memory resources for processing information in response to a request issued by a connection from among said plurality of connections, said resource management unit being operable to:
responsive to a request from a connection for processing information related to said at least one storage device, received by said storage system,
obtain information in respect of an Allocation state of said processing unit, the allocation state being indicative of quantity of a currently allocated resources, which are associated with said processing unit, wherein said Allocation state is defined as a Limiting Allocation state if the quantity of currently allocated resources associated with said processing unit, is greater than a first threshold value;
in case the Allocation state of said processing unit is Limiting Allocation state, obtain information in respect of a Connection state of the connection, wherein said Connection state is defined as a Limiting Connection state if the quantity of resources currently allocated to the connection is greater than a second threshold value; and
dynamically allocate to said connection, memory resources required for processing said information related to said at least one storage device, according to the current Allocation state of said processing unit and the current Connection state of said connection.

24. A non-transitory program storage device readable by machine, tangibly embodying a program of instructions executable by the machine to perform method steps of controlling allocation of memory resources in a storage system, the storage system comprising at least one storage device and a processing unit, said memory resources being associated with said processing unit and operable to communicate with a plurality of connections, the method comprising:
receiving by said storage system a request from a connection for processing information related to said at least one storage device;
obtaining information in respect of an Allocation state of said processing unit, the allocation state being indicative of quantity of a currently allocated resources, which are associated with said processing unit, wherein said Allocation state is defined as a Limiting Allocation state if the quantity of currently allocated resources associated with said processing unit, is greater than a first threshold value;

in case the Allocation state of said processing unit is Limiting Allocation state, obtaining information in respect of a Connection state of the connection, wherein said Connection state is defined as a Limiting Connection state if the quantity of resources currently allocated to the connection is greater than a second threshold value; and dynamically allocating to said connection, memory resources required for processing said information related to said at least one storage device, according to the current Allocation state of said processing unit and the current Connection state of said connection.

* * * * *